(12) United States Patent
Vaidyanathan et al.

(10) Patent No.: US 6,970,895 B2
(45) Date of Patent: *Nov. 29, 2005

(54) PROGRAMMABLE DELAY INDEXED DATA PATH REGISTER FILE FOR ARRAY PROCESSING

(75) Inventors: Krishnamurthy Vaidyanathan, Ossining, NY (US); Geoffrey Burns, Ridgefield, CT (US)

(73) Assignee: Koninklijke Philips Electronics N.V., Eindhoven (NL)

(*) Notice: Subject to any disclaimer, the term of this patent is extended or adjusted under 35 U.S.C. 154(b) by 640 days.

This patent is subject to a terminal disclaimer.

(21) Appl. No.: 10/026,258

(22) Filed: Dec. 21, 2001

(65) Prior Publication Data

US 2003/0062927 A1 Apr. 3, 2003

Related U.S. Application Data

(63) Continuation-in-part of application No. 09/968,119, filed on Oct. 1, 2001, now abandoned.

(51) Int. Cl.[7] .............................................. G06F 17/10
(52) U.S. Cl. ........................ 708/300; 708/315; 708/319
(58) Field of Search ................................ 708/300, 301, 708/302, 315, 313, 319, 320, 422, 425

(56) References Cited

U.S. PATENT DOCUMENTS

| | | | |
|---|---|---|---|
| 5,644,677 A | 7/1997 | Park et al. | |
| 5,659,700 A | 8/1997 | Chen et al. | |
| 5,905,665 A | 5/1999 | Rim | |
| 6,000,834 A | * 12/1999 | Duan | 708/313 |
| 6,366,938 B1 | * 4/2002 | Levison et al. | 708/422 |
| 6,665,695 B1 | * 12/2003 | Brokish et al. | 708/322 |

OTHER PUBLICATIONS

Proakis and Manolakis—Introduction to Digital Signal Processing—MacMillan Publishing Company NY—1988—ISBN: 0-02-396810-9, Section 8.5.4 pp: 662–670, specific figures of relevance Figure 8.89 and 8.90 pp. 667 and 668 respectively.
RD16023—Technical Reference & Programmers Manual, Authors: H. Bauer, D. Lorenz (TCMC), K. Moerman, P. Kievits, H. Dijkstra, E. Rotte, J. Katenbrink, Document I.D. ASG/ESTC-99.0003 V1.3, Modification date: May 20, 1999, Document State Version 1.3 PROPOSAL, Philips Electronics N.V., 1996–1999, pp. 4–7, 56–67.

* cited by examiner

*Primary Examiner*—Chuong D. Ngo
(74) *Attorney, Agent, or Firm*—Aaron Waxler (57) ABSTRACT

A delay addressed data path register file is designed for use in a programmable processor making up a cell in a multi-processor or array signal processing system. The delay addressable register file is particularly useful in, inter alia, adaptive filters where the filter update latency is variable, interpolation filters where the interpolation factor needs to be programmable, and decimation filters where the decimation factor needs to be programmable. The programmability is achieved in an efficient manner, reducing the number of cycles required to perform this task. A single parameter, the "delay limit" value, is programmed at start-up, setting up an internal delay-line within the register file of the processor. Thus, any of the delayed registers can be addressed by specifying the delay index during run-time. The delay line advances one location, modulo "delay-limit", when the processing loop starts a new iteration.

19 Claims, 5 Drawing Sheets

PROGRAMMABLE DELAY INDEXED DATA PATH REGISTER FILE FOR ARRAY PROCESSING

CROSS REFERENCE TO RELATED APPLICATIONS

This application is a continuation-in-part of U.S. patent application Ser. No. 09/968,119, filed on Oct. 1, 2001 now abandoned, for "Programmable Array for Efficient Computation of Convolutions in Digital Signal Processing", applicants Krishnamurthy Vaidyanathan and Geoffrey Burns, the specification of which is hereby incorporated herein by this reference.

TECHNICAL FIELD

This invention relates to digital signal processing, and more particularly, to optimizing data access in array processing and other multiprocessor systems.

BACKGROUND OF THE INVENTION

Circular buffers are commonly found in digital signal processors, such as, for example, the Analog Devices ADSP 2181 or the Philips REAL DSP, where a memory segment can be addressed after modifying the address by a modulo operation. In such cases, the data is fetched in one cycle, stored in a register, and used as an operand in the next cycle. In such examples, the circular buffer is maintained in memory, and in order to process the data stored therein, or properly write new data thereto, memory read/write instructions must be used. Such instructions increase computing overhead, the complexity of the instruction set, as well as the additional time taken by the memory handling. Besides such conventional uses of circular buffers, there are no designs known to exist that allow modulo addressing of a register file directly, or the use of modulo addressing in an array processor. Modulo addressing allows the facilitation of a sequentially linked series of data elements, where when the end of the series is reached, the sequence wraps around to the beginning. As an example, in a circular buffer of N data storage positions, numbered say, from 0 to N−1, where the system is set up such that the next storage position from a given position X is defined as X+1, modulo addressing allows (N−1)+1=0 (mod N), thus achieving the wrapping effect. Alternatively, a circular memory could be set up such that the next memory position I from a given position X is defined as X−1, and then 0−1=(N−1) (mod N), again achieving the wrapping effect.

In the context of a multi-processor, or an array processor designed for high-throughput repetitive signal processing, such as that disclosed in copending U.S. patent application Ser. No. 09/968,119, the individual cell has limited or no memory addressing capability. In such case, maintaining a circular buffer in memory is more than an added complexity to deal with; it is simply impossible.

Thus, what would facilitate a delay line or the like in the cell of such an array processor, i.e., the equivalent to the implementation of a circular buffer in memory, is the facility to modulo address the actual registers where data is stored while under processing. There are no known designs which allow modulo addressing in a datapath instruction.

What is needed to solve these lacunae in the conventional art, is a method and apparatus for modulo addressing of registers in a datapath instruction. Such a method would allow a processor to maintain a sequential series of data, such as a delay line, in the actual registers themselves, thus obviating the need for memory handling capability.

SUMMARY OF THE INVENTION

A delay addressed data path register file is designed for use in a programmable processor making up a cell in a multi-processor or array signal processing system. The delay addressable register file is particularly useful in, inter alia, adaptive filters where the filter update latency is variable, interpolation filters where the interpolation factor needs to be programmable, and decimation filters where the decimation factor needs to be programmable. The programmability is achieved in an efficient manner, reducing the number of cycles required to perform this task. A single parameter, the "delay limit" value, is programmed at start-up, setting up an internal delay-line within the register file of the processor. Thus, any of the delayed registers can be addressed by specifying the delay index during run-time. The delay line advances one location, modulo "delay-limit", when the processing loop starts a new iteration.

Before one or more embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as in any way limiting.

DETAILED DESCRIPTION OF THE PREFERRED EMBODIMENTS

Convolution is a basic signal processing operation found in many applications, especially in digital filters. Digital filters can be elegantly implemented using array processing techniques, such as the reconfigurable adaptive filter array processor used in the Multi-Standard Channel Decoder (MSCD) described in copending U.S. patent application Ser. No. 09/968,119 (the "parent application"), discussed above. The reconfigurable processor array is composed of identical processor cells, each capable of communicating with its nearest neighbors and capable of being programmed individually to perform a single task. Because of the high data rates that need to be supported and the constraints on cost, the cells are constrained to be simple and efficient. The efficiency of the cell is determined in part by the design of an efficient instruction set and the supporting architecture that implements the instruction.

The present invention describes the design of a delay addressed register file and the corresponding instructions. Such an instruction can be put to good use in a variety of filtering applications including, for example, adaptive filtering and multi-rate filtering in the context of array processing. The delay addressed data path register file design can be applied to any array based design of filters and is not limited to the two-dimensional array described in the parent application.

To illustrate the present invention concretely, some preliminary discussion on register addressing modes is in order. Let a given processor have a register file set labeled RI_x, where x is a value between 0 through N−1, and N is the total number of datapath registers. Let the processor also have a typical RISC like instruction set and a sequential controller that executes a specified loop. For example, an add instruction is of the form ADD SRC1 SRC2 DST, where SRC1 is source operand 1, SRC2 is source operand 2 and DST is the destination register. All the three operands are drawn from the register file. Normally, an instruction like ADD RI_0 RI_1 RI_2 would simply add up the contents of register in location 0 of the register file with register in location 1 and store the results in location 2. In a C language notation this would be written as RI[2]=RI[0]+RI[1]. In these examples all addressing is implicit and static (fixed in time).

Pointer modified addressing works slightly differently. Pointer modified addressing is a form of indirect addressing. An additional register set, the pointer register set, is maintained to map the address of a datapath register with the contents of the corresponding pointer register set. Thus, let the pointer register set be called RD_x. An instruction like ADD RI_0 RI_1 RI_2 is actually translated to mean RI[RD[2]]=RI[RD[0]]+RI[RD[1]]. Thus, the operands of the instruction are the data registers whose addresses are contained in the RD_x register set. If the contents of the pointer register set were such that RD_x=x, then the behavior under the pointer modified addressing would be exactly the same as that of the implicit addressing described in the previous paragraph.

The present invention utilizes delay indexed addressing. Delay indexed addressing is a modification on pointer modified addressing. It is, essentially, a pointer modified addressing of the register file with certain initial conditions on the contents of the RD (pointer) register file, and a mechanism for automatic shift of the pointers every data cycle. At start up, the contents of RD are sequentially increasing, which means that RD_0=0, RD_1=1, . . . , RD_N=N, etc. Then, whenever the processing loop starts over, which means whenever the program counter becomes 0, the contents of a register in the pointer register set is shifted to the next register therein, which means (for "next" defined as subsequent) RD_x (current)=RD_(x−1) (prior), and the contents of the first register folds in to the last. (If "next" is defined as precedent, the equivalent shifting can occur, with RD_x (current)=RD_x+1 (prior), and the contents of the last register folds into the first).

Figure 1:
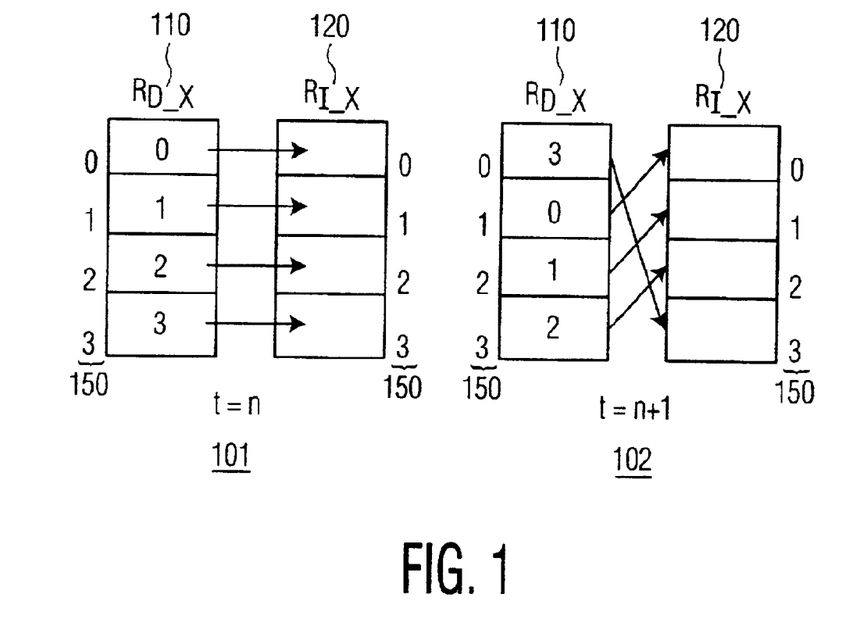
FIGS. 1–2 illustrate pointer modified register addressing.
Figure 2:
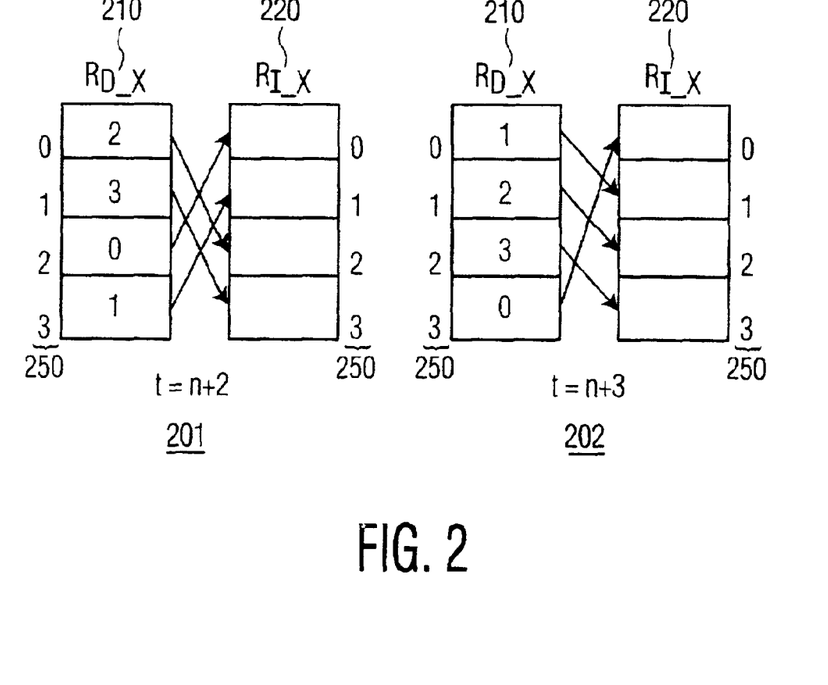

This can be illustrated with reference to FIGS. 1 and 2. In each of these figures depictions of the RD_x 110, 210 and RI_x 120, 220 register sets are shown. Each register bank contains, for the purposes of this example, 4 registers, with addresses 0–3. These addresses of the registers 150, 250 are shown on the (outer) sides of each register. Next here is defined as subsequent, so at each shift the contents of a given RD_x register is shifted to the subsequent register, and the contents of the last register folds into the first. The arrows indicate where the RD_x registers' contents point to in the RI_x register set. In FIG. 1 the t=n 101, or startup condition is illustrated on the left, where RD_x=x. At t=n+1 102, illustrated on the right side of FIG. 1, the contents of the pointer registers RD_x are shifted such that RD_x (current)=RD_(x−1) (prior) as described above. This addition is carried out modulo 4, such that 0−1=3 (mod 4), and thus the address contained in RD_0 is 3 at t=n+1. FIG. 2 completes the temporal sequence, and depicts the register sets for t=n+2 201 and t=n+3 202, respectively. As is seen, for a four register set t=n+4 is identical to t=n. This addressing system creates a circular buffer, as will be described below.

The contents of the RD_x registers are the addresses of the RI_x registers. The contents of the RI_x registers are the data being processed by the processor. In general the data will change with time, as data enters and exits the processor. It is easily seen that if each time the program counter resets a new datum enters the RI_x register set 120, 220, then a delay line of depth equal to one less than the number of registers in the RD_x set is set up. In the example of FIGS. 1–2, a delay line of depth 3 can be thus set up, the processor having access to the current datum (usually a sample of some analog value procured at a given sampling rate), and the previous three data, or samples. I.e., the processor has access to data samples $X_n$, $X_{n-1}$, $X_{n-2}$, and $X_{n-3}$.

Figure 1A:
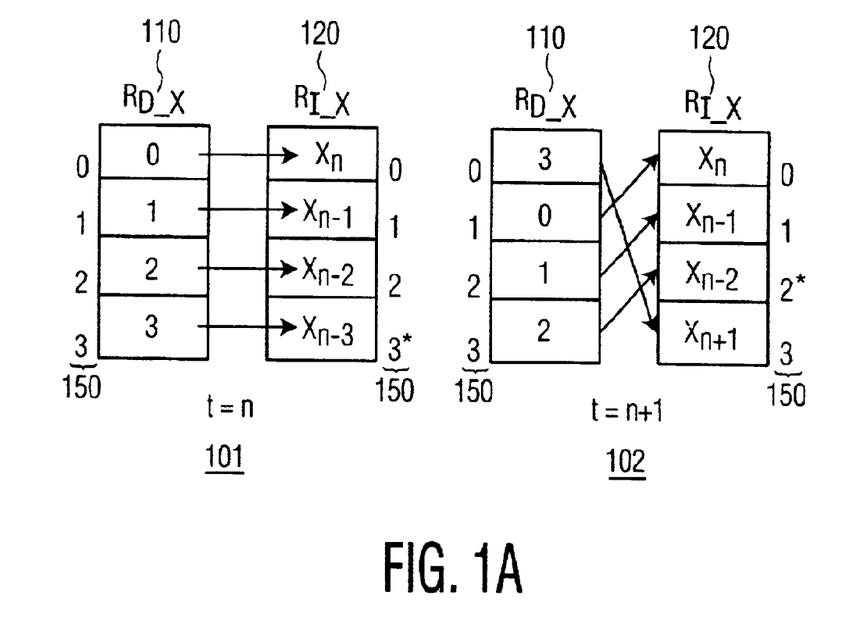
FIGS. 1A and 2A are FIGS. 1 and 2, respectively, with exemplary contents of the data registers.
Figure 2A:
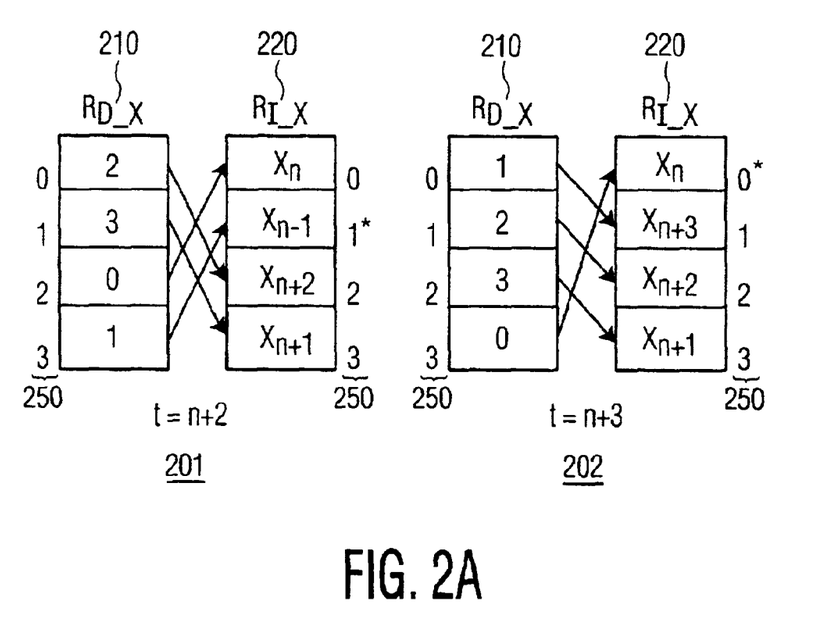
Figure 3:
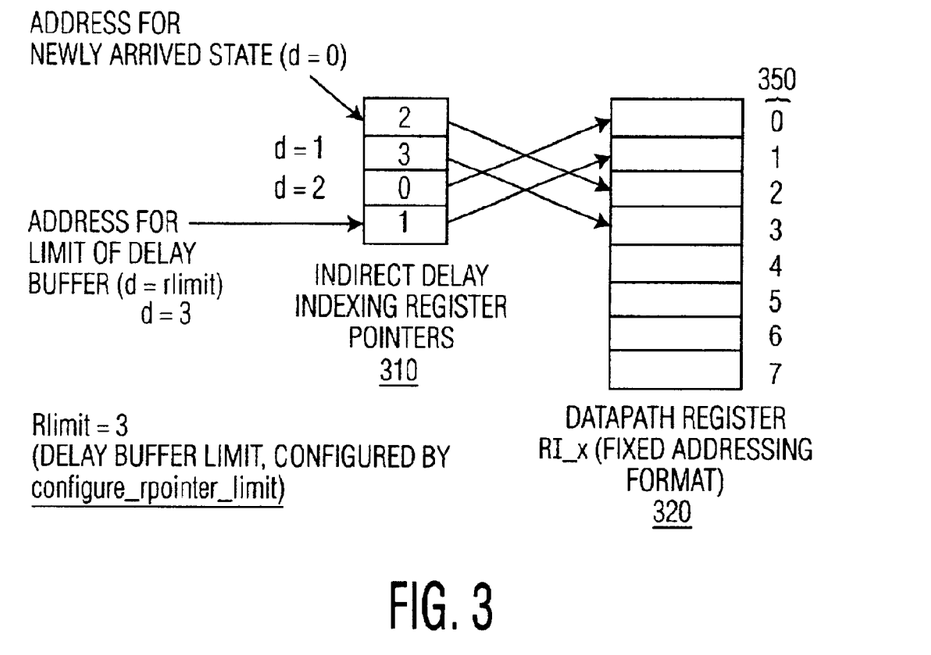
FIG. 3 depicts an example delay-indexed register set according the present invention.

FIGS. 1A and 2A, respectively correspond to FIGS. 1 and 2, to which they are identical, with the addition of example contents of the data register set RD_X. The asterisk at any given time shows where the next incoming sample (i.e., sample Xn+1 at time t=n; in general sample Xk+1 at time t=k etc.) will be written to. As can be seen, the new sample is always written over the oldest, or most delayed sample, stored in the register set. For the depicted exemplary delay of three, the new sample always overwrites the sample three sample periods behind the current sample, or for t=n, the Xn+1 sample overwrites the Xn−3 data sample. Thus the new sample is always written—in this example—to the RI register one behind the register with the current sample, or to the RI_X register pointed to by the RD_(0−1) register, RI[RD_3]. As one steps forward through all the data registers one at a time from the RI[RD_0] register, modulo 4 (so RI[RD_(3+1)] =RI[RD_0]), one finds samples of increasing delay. The RD_x registers thus create a circular buffer whose elements are indexed (addressed) by the delay. FIG. 3 illustrates such delay-indexed addressing for a delay buffer of depth 3. In FIG. 3 only a portion of the available RD_x registers are shown, there thus being the possibility of a depth equal to the actual number of registers in the RD_x set. Due to only four registers in the RD_x set being utilized for the delay line, only registers 0–4 of the RI_x set are involved in storing the delay line data. An operand of RD0 in an instruction points to the register with the most recent value in the delay buffer, while an operand of RD3 points to the value of delay 3, or $X_{n-3}$. Thus the addresses for the RD_x register set are actually interpreted as delays. Where these RD_x registers point to in the RI_x set changes with time.

Figure 4:
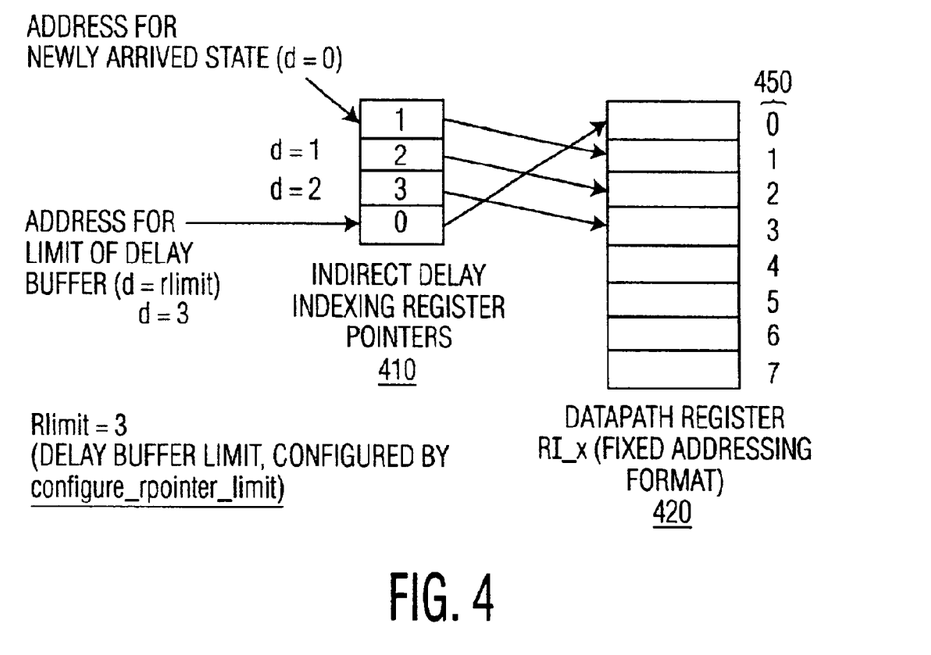
FIG. 4 depicts the register of FIG. 3, shifted by one.

FIG. 4 shows the advancement of the register pointers upon arrival of the new state. To implement a circular buffer on a partial set of registers from the datapath register file, a delay limit, called limit in FIGS. 3–4, is introduced and the pointer register shift is done modulo (rlimit+1); thus the contents of each RD_x register are changed by the subtraction of 1 (modulo (rlimit+1)). The modulus is (rlimit+1) because rlimit is the maximum delay stored in the RI_x registers, but the actual number of registers in the delay line is (rlimit+1), to include the zero delay, or current, sample Xn. In FIGS. 3 and 4, the value of rlimit is 3, thus there are four registers utilized in the delay line.

To preserve the three most recent samples in the circular buffer, the new sample, with a delay of zero, is written in to the ever changing (modulo rlimit+1) RI_x register which is pointed to by the RD_0 register. For the system of FIGS. 3 and 4, the contents of the RD_x registers will cycle in time as depicted in FIGS. 1–2; FIG. 3 corresponds to t=n+2 201, in FIG. 2, and FIG. 4 to t=n+3 202, in FIG. 2.

In general, a delay indexed pointer register allows a processor to implement any filter or other data processing operation whose inputs are a current datum and a number of data preceding the current datum in some sense. If the data vary relative to each other in time, then a temporal delay line can be maintained, allowing access to a current sample and a number of prior samples, such as is commonly required in FIR filters. The number of samples stored in the delay line will correspond in such a case to the number of delays in the filtering equation plus one, or in terms of the system depicted in FIGS. 3–4, (rlimit+1). The processor knows how many data samples are in the delay line by means of a preprogrammed variable rlimit, which gives the maximum delay stored in the data registers. The index registers are automatically incremented using modular arithmetic so as to preserve the delay relationships between the ever-changing data.

Alternatively, a "delay line" could be implemented where the samples vary not in time, but in space, such as in image processing operations, where "prior" corresponds to the prior in space, as defined by some direction within an image.

The usefulness of such a delay indexed pointer register will be next illustrated by the following examples.

Application 1: Compensation of Error Latency in an Adaptive Filter

Figure 5:
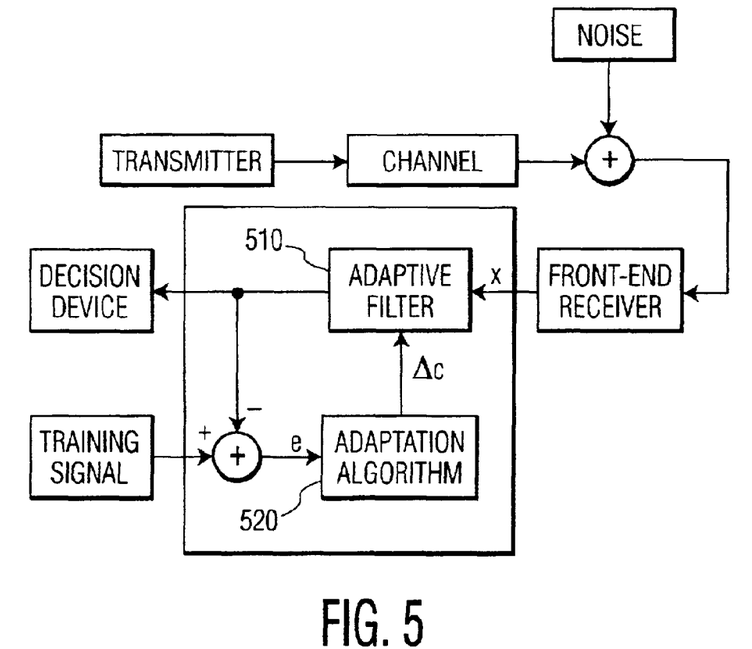
FIG. 5 depicts a typical configuration of an adaptive filter as an equalizer.

The delay-indexed datapath register (RD_x) can be used to simplify programming of the tap delay line for adaptive FIR filters. Consider the least mean squares (LMS) algorithm in particular. The filtering equation is provided by, $$y_n = \sum_{i=0}^{N-1} c_i \times x_{n-i} \quad (1)$$

where $x_n$ are the filter states and $c_n$ are the filter coefficients. The filter coefficients are updated according to the formula:

$$C_n^+ = C_{ni}^- + \mu * X_n^- * \epsilon^- \quad (2)$$

where $\mu$ is a constant, and $\overline{E}$ is the error in the filtered output, calculated from a previous filter calculation. FIG. 5 shows the use of such a filter in a channel equalizer. In practice there is a finite latency, measurable in terms of number of input sample periods, between the time a given sample "Xn" appears at the input of the adaptive filter 510 and the time the error "E" is calculated and made available to the adaptation unit 520. If this filter update latency is more than or equal to one sample period, then the update equation has to be modified to use an equally delayed state value x, such as Xn-d, where d is the appropriate delay.

If the adaptive filter is implemented on an array processor, and a single tap of the FIR filter is mapped to one cell of the array, the filter update latency is the difference, measured in input data sampling periods, between the time the newly calculated error arrives at the cell and the time at which the filter tap output was calculated in the cell. In order to fetch the delayed state, the cell needs a delay buffer. This delay buffer is constituted from a subset of the existing internal registers, as described above, with each element addressed by its relative delay to the most recently arrived local state d=0, stored at RI[(RD_0)]. For example, let the latency be 3, let the coefficient $Cn^+$ be stored in register RI_5, the error in RI_4, and the current state Xn be stored in RI[RD_0]. To implement the filter update equation, the cell is programmed with a delay limit, rlimit=3, and the update equation becomes RI_5=RI_5+RI_4*RI[RD_3]. Since the register contents of the delay line are automatically shifted, every data sample period, no additional data movements are required.

The processor is programmed so as to automatically interpret operands in instructions of the type RI_X as RI[RD_X]. Thus, the user need not be at all concerned with the mapping of the pointer registers to the data registers. Accordingly, in the examples that follow, instructions will be illustrated in terms of RI_X operands, it being understood that the processor is programmed to automatically convert those to RI[RD_X] operands.

Application 2: Efficient Implementation of a Programmable Interpolation Filter

Figure 6:
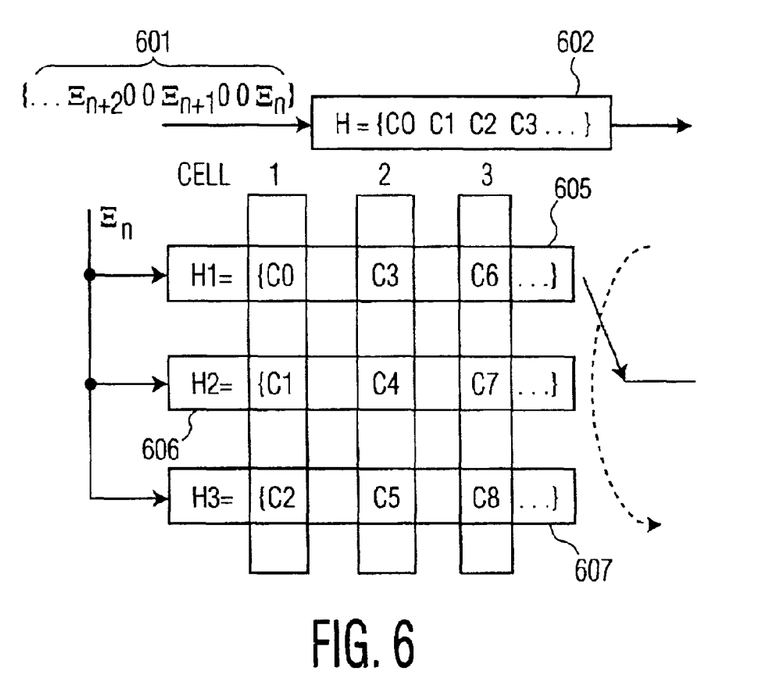
FIG. 6 depicts a polyphase implementation of an interpolation filter.

An interpolation filter is a multi-rate filter where the output data rate is a multiple of the input data rate. A frequently used case is when this multiple is an integer. Such an interpolation filter implements equation 1, but the input sequence is x is the actual input data with zeros stuffed in between. For example, if the interpolation multiple is 3, then the input data stream 601 is modified by inserting 2 zeros between every pair of data samples before applying the filter 602. Since two in three data values are zeros, at any point in time only one third of the filter taps produce a non-zero output. A poly-phase filter utilizes this fact to avoid implementing the zero output taps. For a full description of this see Proakis and Manolakis, Introduction to Digital Signal Processing (MacMillan Publishing Company New York, 1988) ISBN: 0-02-396810-9, pp: 662–670, and pages 667 and 668 respectively.

FIG. 6 shows the working of a polyphase filter used as the interpolation filter for an interpolation multiple of 3. Equation 1 is then implemented as three filters that take a common input and whose outputs are multiplexed in time. The mapping of the filter taps to the cells is also shown in the figure. The delay limit register, rlimit, is programmed to be 2. Coefficients 0, 1, and 2 are stored in RI_, RI_1 and RI2 respectively. The coefficients are thus stored in consecutive registers which are delay addressed. The controller program executes three loops, for every data sample period. Let the input data in a cell be stored in RI_3. Then, an FIR tap can be modeled by the instruction RI_4=RI_3*RI_2; since delay addressing is in effect, during the first program cycle RI_2 has coefficient C0, during the second cycle RI_2 has C1 and in the third RI_2 has C2. This is equivalent to the entire array being reconfigured to implement H1 605 in the first cycle, H2 606 in the second and H3 607 in the third. The filter output in each program cycle corresponds to the interpolation filter output, thereby inherently implementing the output multiplexer. Note that the state is shared between the filters; for a 9-tap filter and an interpolation factor of 3 there are only 3 states needed.

Application 3: Efficient Implementation of a Programmable Decimation Filter

Figure 7:
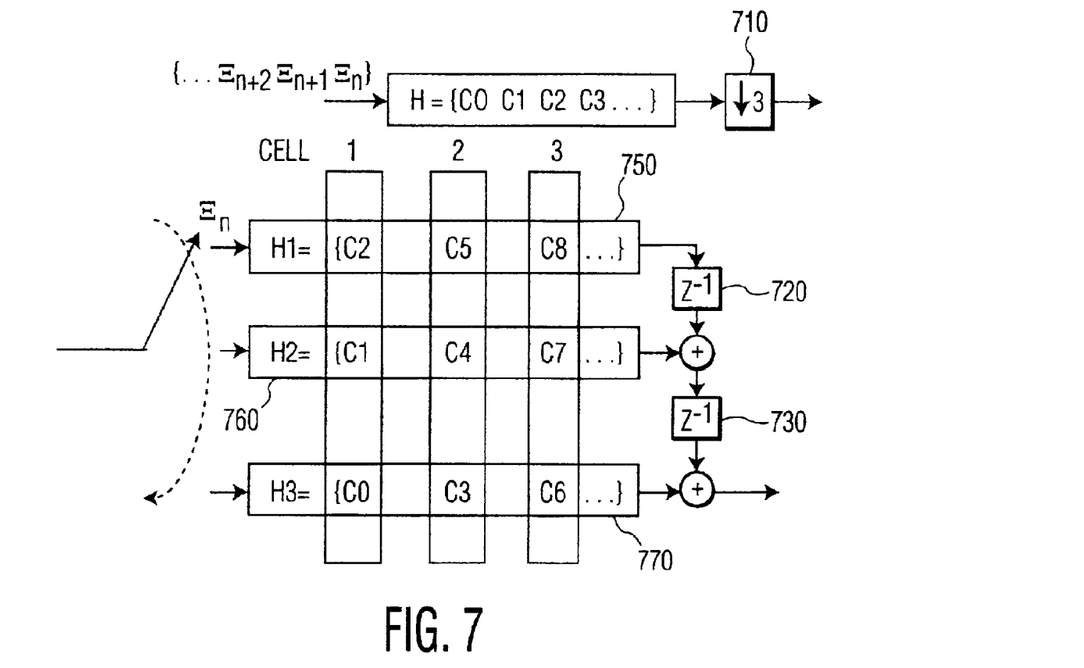
FIG. 7 depicts a decimation filter.
Figure 8:
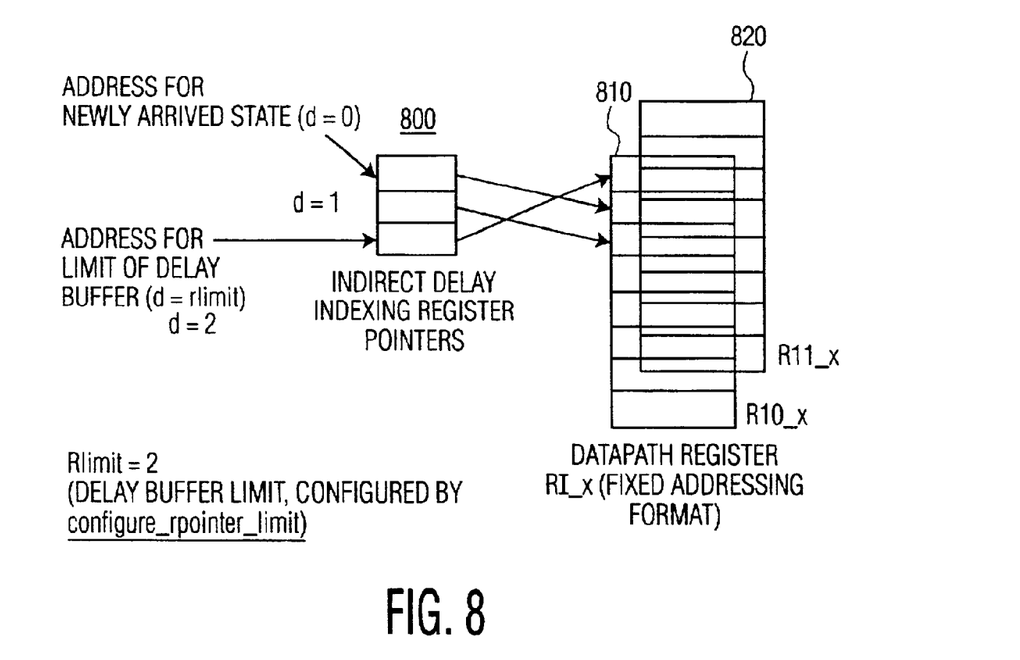
FIG. 8 depicts a dual register file for a decimation filter.

The decimation filter is just the dual of the interpolation filter. Such a decimation filter is depicted in FIG. 7. For a decimation factor of 3 710, two out of three output samples after filtering are discarded. This means that the discarded filter outputs need not be calculated in the first place. This structure can be derived by simply reversing the flow graph of the interpolator depicted in FIG. 6, which results in the structure shown in FIG. 7. However, unlike the interpolation structure of FIG. 6, the states are not shared. The two output delays inherent in the system are shown at 720 and 730 in FIG. 7. In order to maintain independent state registers a second delay addressed register buffer is required, addressed by the same pointer register RD_X An example implementation of just such a system is shown in FIG. 8. The two delay addressed register buffers are addressed in lock-step, fetching the corresponding pairs of coefficients and states.

To illustrate this, let the two delay addressed register buffers be labeled RI0_X 810 and RI1_X 820. Let the coefficients be stored in RI0_X 810; specifically for the example of decimation by 3, let RI0_0 be C0, RI0_1 be C1 and RI_2 be C2, as above. Let the incoming data be stored in RI1_X 820. Specifically, let the new data sample be stored in RI1_0, so that RI1_0 is Xn, RI1_1 is Xn−1 and RI1_2 is Xn−2. Let the parameter rlimit be 2 (modulo 3) as in the case of the interpolator example discussed above, setting up a delay line with three consecutive elements. The RD_X register bank 800 stores the addresses of the two RI_X register buffers 810 and 820. In general, (rlimit+1) is the number of FIR taps being computed in one cell. An instruction like RI1_4=RI0_0*RI1_0 models the FIR tap calculation. This actually implements C2*Xn−2, C1*Xn−1, C0*Xn in three consecutive cycles, generating time multiplexed outputs, which are synchronized using delays 720 and 730 (with refernce to FIG. 7) and added outside of the cell. This is equivalent to the entire array being configured to perform filter H3 770 (with respect to FIG. 7) in the first cycle, H2 760 in the second and H1 750 in the third cycle. The oldest data Xn−3, which is located in RI1_0 prior to being overwritten by the newest data Xn, is passed on to the next cell in the array.

While the invention has been described in details with reference to various embodiments, it shall be appreciated that various changes and modifications are possible to those skilled in the art without departing the gist of the invention. For example, one or more data register banks RI_X can be indexed by the same RD_X pointer register bank, each data register bank being addressed in lock step. As well, in other embodiments the data register bank and the pointer register bank can each be incremented at a rate different than the data sample rate. Thus, the scope of the invention is intent to be solely defined in the following claims.

What is claimed:

1. A modulo addressable data path register file for a processor, comprising:
   a first set of registers (RD_X) and
   a second set of registers (RI_X);
   where the first set of registers stores addresses of the second set of registers and where the second set of registers stores data; and
   where two or more of the first set of registers are ordered sequentially in a circular structure such that the first register falls next in sequence after the last.

2. The register file of claim 1,
   where the registers in the circular structure change their contents according to the equation RD_X=RD_(X+k) (modulo M, where k is an integer, each time a processor loop begins a new iteration; and
   where the modulus M is equal to the number of registers from the first set used in the circular structure multiplied by |k|, for nonzero k, and by 1 for k=0.

3. The register file of claim 2, where k is one of 0, +/−1, +/−2, +/−3 or +/−4.

4. The register file of claim 3, where the N registers in the first set are numbered from 0 to N−1.

5. The register file of claim 4, where the circular structure is used to store a sequence of N data samples, each being delayed one sample period from the prior sample in the sequence.

6. The register file of claim 5, where the parameter N is programmable at a start-up of processor operation, and is equal to one greater than that the maximum supported delay, as expressed in units of sample periods.

7. The register file of claim 6, where the samples are stored in the RI_X register set.

8. The register file of claim 7, where the RI_X registers are pointed to by the RD_X registers in the circular structure.

9. The register file of claim 8, where the samples are stored in sequential locations in the RI_X register set.

10. A multi processor system, comprising:
    a plurality of cells, each with an individual processor;
    where each cell has the register file of claim 6, and
    where the processor can execute instructions whose operands are the RD_X registers.

11. The system of claim 10, where each cell has a programmable parameter which sets the value of N for that cell.

12. A method of optimizing digital signal processing, comprising;
    implementing modulo addressing in a first register bank (RD_X);
    enabling the processor to operate on data in a second register bank by operating on registers in the first register bank that points to the data.

13. The method of claim 12, where
    the registers in the first register bank change their contents according to either the equation RD_X=RD_(X+k) (modulo M), where k is an integer, each time a processor loop begins a new iteration; and
    where the modulus M is equal to a number equal to the registers in the first register bank used to point to data in the second register bank multiplied by |k| for nonzero k, and by 1 for k=0.

14. The method of claim 13, where an unused register in either the first or the second register banks stores the value of M.

15. The method of claim 14, where a dedicated register in the first register bank stores the value of M.

16. A method of implementing digital filtering, comprising:
    storing a current data sample and a number of prior data samples in a first register bank;
    indexing said current sample and prior data samples by the relative delay to the current sample; and
    automatically updating the contents of the first register bank each sample period to write a new data sample over the most delayed sample stored in the register bank, wherein the indexing of the data samples in the first register bank is maintained by a second register bank (RD_X) which stores the addresses of the registers In the first register bank.

17. The method of claim 16, where the second register bank is automatically incremented each sample period according to the equation RD_X=RD_(X+k) (modulo M), where k is an integer, each time a processor loop begins a new iteration; and
    where the modulus M is equal to a number equal to the registers in the first register bank used to point to data in the second register bank multiplied by k multiplied by |k|, for nonzero k, and by 1 for k=0.

18. A method of implementing digital filtering, comprising:
    storing a first data set comprising a current data sample and a number of prior data samples in a first register bank;

storing one or more additional data sets, each comprising a current data sample and a number of prior data samples in an additional register bank;

indexing each said data set by the relative delay of a sample to the current sample; and automatically updating the contents of each of the first register bank and the additional register banks each sample period to write a new data sample over the most delayed sample stored in each register bank, wherein the indexing of the data samples in the first register bank and each of the additional register banks is maintained by a pointer register bank (RD_X) which stores the addresses of the registers in the first and each of the additional register banks.

19. The method of claim 18, where the pointer register bank is automatically incremented each sample period according to the equation RD_X=RD_(X+k) (modulo M), where k is an integer, each time a processor loop begins a new iteration; and where the modulus M is equal to a number equal to the registers in the pointer register bank used to point to data in the first and each of the additional register banks, multiplied by |k|, for nonzero k, and by 1 for k=0.

* * * * *